United States Patent [19]

Weiss et al.

[11] Patent Number: 5,758,756

[45] Date of Patent: Jun. 2, 1998

[54] FRICTION CLUTCH IN THE DRIVE TRAIN OF A MOTOR VEHICLE

[75] Inventors: Michael Weiss, Dittelbrunn; Reinhold Weidinger, Unterspiesheim, both of Germany

[73] Assignee: Fichtel & Sachs AG, Schweinfurt, Germany

[21] Appl. No.: 721,693

[22] Filed: Sep. 26, 1996

[30] Foreign Application Priority Data

Sep. 26, 1995 [DE] Germany ............. 195 35 712.4

[51] Int. Cl.⁶ ............................................... F16D 13/75
[52] U.S. Cl. ............................ 192/70.25; 192/70.27; 192/89.23; 192/89.24; 192/110 R; 192/111 A
[58] Field of Search .................... 192/70.25, 70.27, 192/89.22, 89.23, 89.24, 98, 109 R, 110 R, 111 A

[56] References Cited

U.S. PATENT DOCUMENTS 5,579,881  12/1996  Weidinger ............. 192/70.25

FOREIGN PATENT DOCUMENTS

| 3991022 | 3/1990 | Germany. |
| 2278894 | 12/1994 | United Kingdom. |
| 2287994 | 10/1995 | United Kingdom. |
| 2296541 | 7/1996 | United Kingdom. |
| 2296542 | 7/1996 | United Kingdom. |

*Primary Examiner*—Richard M. Lorence
*Attorney, Agent, or Firm*—Cohen, Pontani, Lieberman, Pavane

[57] ABSTRACT

A diaphragm-spring friction clutch in which an additional spring is arranged which exerts little or no releasing force in the engaged state and high releasing force in the disengaged state. The spring characteristic of the additional spring can be adapted via adjustable stop elements in order to achieve the desired spring characteristics even with unfavorable tolerances.

23 Claims, 10 Drawing Sheets

FRICTION CLUTCH IN THE DRIVE TRAIN OF A MOTOR VEHICLE

BACKGROUND OF THE INVENTION

1. Field of the Invention

The present invention relates to a friction clutch in the drive train of a motor vehicle. More particularly the invention relates to a friction clutch having a clutch housing which is fastened to a flywheel of an internal combustion engine and can revolve therewith about an axis of rotation, a contact-pressure plate which is arranged in the clutch housing so as to be fixed with respect to rotation but axially displaceable relative thereto, a clutch disk which is arranged between the contact-pressure plate and the flywheel and has friction facings, a diaphragm spring which is supported at the contact-pressure plate on one side and at the clutch housing on the other side and which loads the contact-pressure plate in the direction of the flywheel to generate contact-pressure force, a disengaging element which acts on the radial inner regions of the diaphragm spring and is part of a disengagement system, and a device for automatically compensating for the wear of the friction facings to maintain the fitting position of the diaphragm spring and contact-pressure force.

2. Description of the Prior Art

A friction clutch of the constructional type mentioned above is known, e.g., from the German Patent 39 91 022. This reference describes a diaphragm-spring clutch which is provided with an additional spring element which takes effect as the wear on the friction facings increases and whose spring force is directed counter to the spring force of the diaphragm spring. In this way, the elevation of the spring force in the worn region, which is typical of a diaphragm spring, is influenced such that the contact-pressure force exerted by the diaphragm spring remains substantially constant.

SUMMARY OF THE INVENTION

The object of the present invention is to provide an improved friction clutch according to the prior art in which the disengagement force is appreciably reduced and an adjustment of the friction clutch can be carried out easily.

Pursuant to this object, and others which will become apparent hereafter, one aspect of the present invention resides in a friction clutch having a clutch housing fastenable to the flywheel of the internal combustion engine so that the clutch housing and the flywheel revolve about an axis rotation. A contact-pressure plate is arranged in the clutch housing so as to be fixed with respect to rotation but axially displacable relative thereto. A clutch disk is arranged between the contact-pressure plate and the flywheel, and has friction facings. Diaphragm spring means are supported on one side at the contact-pressure plate and on another side at the clutch housing for loading the contact-pressure plate in a direction of the flywheel to generate a contact-pressure force. Disengaging means including a disengaging element are arranged to act on radial inner regions of the diaphragm spring means so as to disengage the friction clutch. Means are also provided for automatically compensating for wear of the friction facings of the clutch disk so as to maintain a fitting position of the diaphragm spring means and the counter-pressure force. Further spring means, such as a diaphragm spring or a plate or cup spring, having a steep spring characteristic are supported on one side at an axially fixed structural component and on another side at another structural component so as to be within an actuating chain formed between the contact-pressure plate and the disengaging means. The further spring means is operative to exert substantially no releasing in force when the friction clutch is engaged and to exert increasing releasing force as a disengagement path of the clutch increases. At least one adjustable stop element is arranged to define at least one of a level and progression of force exerted by the further spring means.

By using a diaphragm spring or a plate or cup spring, preferably with a steep spring characteristic, to assist the disengagement force and by arranging at least one adjustable stop element to define the level and/or progression of force exerted by the diaphragm spring or plate spring, it is possible to bring about a sharp reduction in the actuating force of the friction clutch without incurring the risk of an intersection or tangential contact of the rising branch of the spring characteristic of the diaphragm spring or plate spring with the falling branch of the spring characteristic of the diaphragm spring resulting in a blocking of an automatic engaging movement. Due to the adjustable stop torque, it is possible to provide the spring characteristic of the diaphragm spring or plate spring with a steep fundamental characteristic and to influence the characteristic to the extent that it does not fall below a minimum distance from the characteristic of the diaphragm spring. In addition, spreading or scattering of the spring characteristics can be compensated for.

In another embodiment the stop element is arranged at a substantially fixed or axially fixed structural component part so as to be adjustable and so as to extend into the movement space of the diaphragm spring or plate spring. For this purpose, the support via the stop element can be formed in a springing resilient manner in order to smooth the transition from the fundamental characteristic to the influenced characteristic.

In a friction clutch in which a central diameter region of the diaphragm spring is supported at the clutch housing via support elements in order to form an over-center action or toggle circle and the radial outer region of the diaphragm spring acts on the contact-pressure plate and the diaphragm spring is provided on its radial inner side with spring tongues to be acted upon by a disengagement system, it is proposed that the diaphragm spring or plate spring be arranged between the diaphragm spring and clutch housing and act via its radial inner region, e.g., in the form of spring tongues, in the engaged state and at least along a first region of the disengagement path, on the spring tongues radially between the toggle circle and the working region of the disengagement system. At least one adjustable stop element is arranged in this diameter region at the clutch housing. This stop element can limit the axial force effect of the diaphragm spring or plate spring in its radial inner region in the direction of the spring tongues of the diaphragm spring. As a result of the proposed adjustable stop elements, it is possible to influence the action of the diaphragm spring or plate spring in the region of the disengaged state of the friction clutch so that the effect on the spring tongues of the diaphragm spring decreases sharply or is completely eliminated. This enables a precision adjustment which allows for tolerances of the diaphragm spring or plate spring as well as tolerances of the diaphragm spring. Accordingly, it is possible for the scatter which is relatively considerable in springs of this type in any case to be compensated for in an economical manner.

Naturally, it is possible to provide only one stop element in the circumferential region of the diaphragm spring or plate spring. One element is sufficient in most cases to correct the spring force curve.

For this purpose, the region of the clutch housing in which the stop element is arranged is constructed so as to be resilient in the manner of a spring tab. This results in a smooth transition from the original spring characteristic to that influenced by the stop element.

The stop element can be formed as a tab which is bent out of the clutch housing and is adjustable by plastic deformation relative to the diaphragm spring or plate spring. A construction of this type is particularly simple to manufacture and store.

In a friction clutch of the type under discussion, it is proposed that the diaphragm spring or plate spring is arranged between the diaphragm spring and clutch housing and can contact, by its radial outer diameter region, the inner wall of the clutch housing at least in a second region of the disengagement path via a support and at least one adjustable stop element is arranged on a diameter smaller than that corresponding to the support and can reduce the contact of the diaphragm spring or plate spring—at least in a circumferentially defined region and at least in a first region of the disengagement path—to a smaller diameter. By means of this stop element, a change in contact which changes the effective diameter of the diaphragm spring or plate spring can be effected at the housing during the movement of the diaphragm spring or plate spring. Accordingly, the steepness of the characteristic line can be influenced in order to adapt to the prevailing conditions in the friction clutch. Above all, the steepness of the characteristic line of the diaphragm spring or plate spring can be influenced in a first region of the disengagement path by means of such a stop element in order to adjust a lower disengagement force.

In a further embodiment of the inventive friction clutch the diaphragm spring or plate spring is arranged between the diaphragm spring and the clutch housing and is supported in its central diameter region at a circumferential bead of the housing and cooperates, via a larger diameter region, preferably via its outer diameter region, with an adjustable stop element arranged in the clutch housing. By means of the arrangement of a stop element of this type, it is possible to increase the contact diameter of the diaphragm spring or plate spring during the disengagement process from a smaller diameter to a larger diameter so as to achieve a flatter spring characteristic as the disengagement path increases. For this purpose, a spring element, preferably in the form of a wave spring, can be provided in order to realize a smooth transition between the stop element and the diaphragm spring or plate spring.

In this case, as in the previously described embodiments, it is often sufficient to provide one stop element at the circumference so that a relatively smooth transition in the spring characteristic can already be achieved in this way. Of course, there can also be applications where a plurality of stop elements are distributed along the circumference.

In another advantageous embodiment, the diaphragm spring or plate spring has at least one radially extending spring tongue proceeding from the outer diameter. In the engaged state of the friction clutch, this spring tongue prevents the diaphragm spring or plate spring from snapping over on the one hand and, on the other hand, cooperates in a second region of the disengagement path with at least one adjustable stop element which is arranged in the clutch housing. As a result of this arrangement, the shape of the spring characteristic can be flattened primarily in the end region of the disengagement path so as to reliably prevent an intersection with the characteristic line of the diaphragm spring. At the same time, this arrangement prevents the diaphragm spring or plate spring from snapping over in the engaged state.

In a friction clutch in which the diaphragm spring is supported in its radial outer region at the clutch housing and, in a central region, at the contact-pressure plate and is provided with spring tongues radially on the inner side which are acted upon by a disengagement system, it is proposed that the diaphragm spring or plate spring is arranged on the outer side of the clutch housing facing away from the diaphragm spring and acts, at least along a first region of the disengagement path, via spring tongues which face radially inward, on the spring tongues of the diaphragm spring in a region between the support at the contact-pressure plate and the working region of the disengagement system. There is arranged in this diameter region at the clutch housing at least one adjustable stop element which can limit the diaphragm spring or plate spring in the region of the spring tongues with respect to the axial force effect in the direction of the spring tongues. In this construction, which corresponds to a so-called pulled friction clutch, it is possible to influence the diaphragm spring or plate spring in the end region of the disengagement path by means of the adjustable stop element or stop elements such that its effect on the diaphragm spring is reduced and the risk of an intersection of the characteristic lines of the two springs is prevented. Accordingly, it is possible to realize a relatively steep spring characteristic of the diaphragm spring or plate spring so that the friction clutch can be actuated by a slight disengagement force.

In still another embodiment the diaphragm spring or plate spring is arranged on the outer side of the clutch housing facing away from the diaphragm spring and can contact the clutch housing approximately in the radial outer diameter region via a support at least in a second region of the disengagement path. At least one adjustable stop element is arranged on a diameter which is smaller than the radial outer diameter region, by means of which stop element the contact of the diaphragm spring or plate spring—at least in a circumferentially defined region and at least in a first region of the disengagement path—can be reduced to a smaller diameter. Due to this construction, the spring characteristic of the diaphragm spring or plate spring can be influenced so that the spring characteristic proceeds in an increasingly flatter manner as the disengagement path increases.

Another possibility for influencing the spring characteristic in an external diaphragm spring or plate spring consists in that the spring is supported via a central diameter region at a circumferential bead of the clutch housing via a support and at least one adjustable stop element is provided in a larger diameter region. The adjustable stop element forms an adjustable support for the diaphragm spring or plate spring at least in a second region of the disengagement path and at least in a circumferentially defined region. In addition, the diaphragm spring or plate spring can have at least one spring tongue which faces radially outward and cooperates in a second region of the disengagement path with an adjustable stop element which is arranged in the housing so as to influence the tapering off of the spring characteristic in this way.

According to the invention, the diaphragm spring or plate spring arranged on the outer side of the housing in the pulled friction clutch has two different types of spring tongues which extend radially inward. The first type penetrates intermediate spaces between the individual spring tongues of the diaphragm spring and contacts the spring tongues on the side of the diaphragm spring facing the contact-pressure plate via a locking arrangement. The second type is offset circumferentially and contacts one or more spring tongues on the opposite side of the diaphragm spring. By means of this second type of spring tongue, it is possible in a simple manner to reliably prevent the diaphragm spring or plate spring from snapping in the engaged state of the friction clutch.

In a pushed friction clutch with a diaphragm spring which is actuated by a clutch release with revolving axially movable elements, nonrevolving axially movable elements and nonrevolving axially fixed elements, the diaphragm spring or plate spring is supported in the region of its outer diameter at a nonrevolving, axially fixed element of the clutch release and is supported in the region of its inner diameter—preferably by spring tongues—at a nonrevolving, axially fixed element. At least one stop element, whose head penetrates the diaphragm spring or plate spring for the purpose of adjustable path limiting, is provided at the nonrevolving, axially fixed element. An arrangement of this kind can be adjusted easily and serves at the same time to hold the revolving parts of the release bearing in constant contact with the diaphragm spring.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
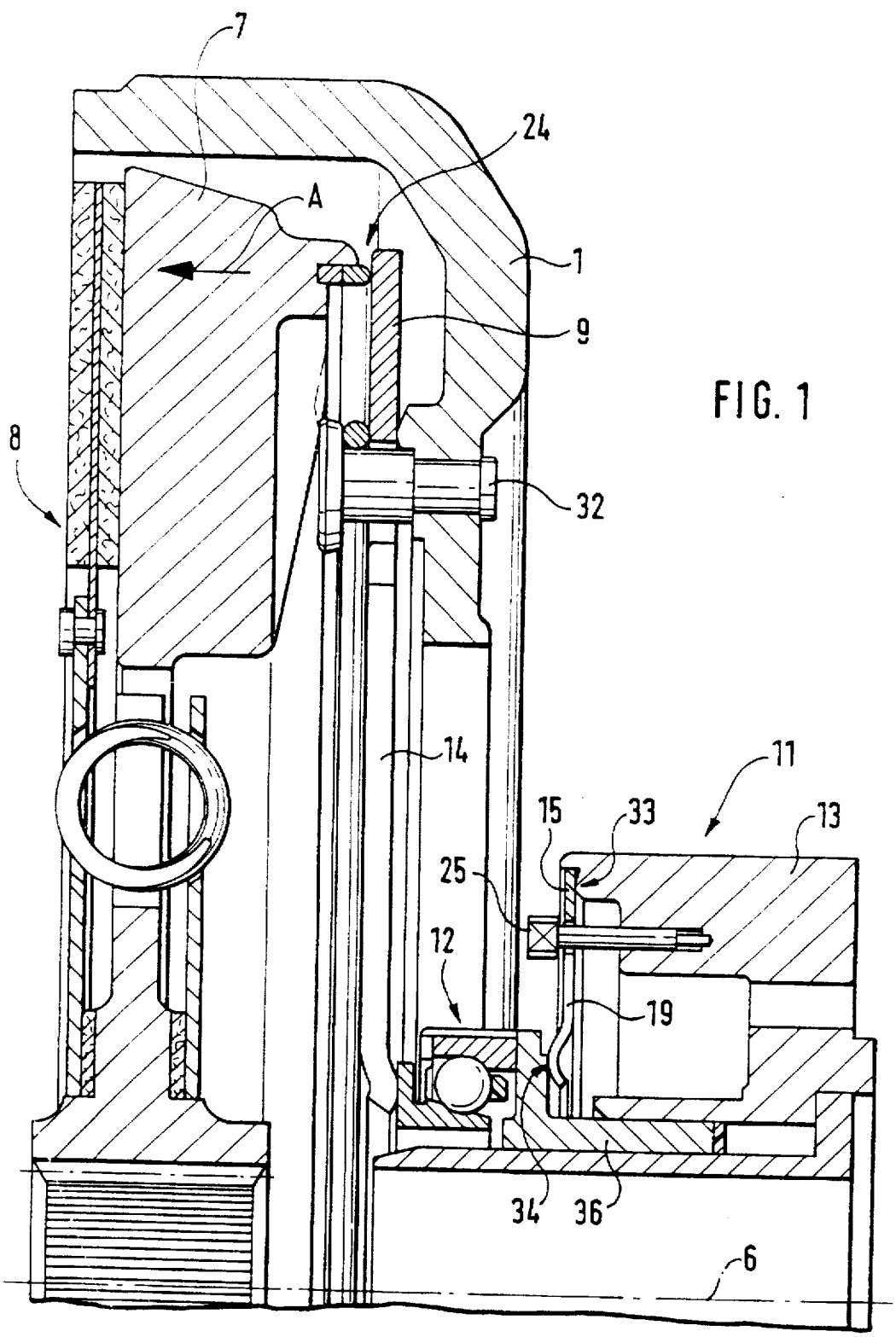
FIG. 1 is a longitudinal section through the upper half of a friction clutch with a disengagement system pursuant to the present invention.

FIG. 1 shows the basic construction of a pushed diaphragm-spring clutch. A clutch disk 8 is supported on a gear shaft, not shown, concentrically to an axis of rotation 6 so as to be fixed with respect to rotation thereto but so as to be axially displaceable. The clutch disk 8 is part of a pressing plate which is formed of a clutch housing 1 comprising a contact-pressure plate 7 and a diaphragm spring 9. The clutch disk 1 is attached to a counter-pressure plate, not shown, which is driven by the crankshaft of an internal combustion engine. This counter-pressure plate and the contact-pressure plate 7 both have a friction surface for gripping the friction facings of the clutch disk 8. The diaphragm spring 9 is fixed at the clutch housing 1 at mid-diameter by spacer bolts 32. The spacer bolts 32 form a circular ring concentric to the axis of rotation 6 about which the diaphragm spring 9 is swiveable during operation. The diaphragm spring 9 acts on the contact-pressure plate 7 via a wear compensating device 24. As a result of this device 24, the distance between the diaphragm spring 9 and the contact-pressure plate 7 is adjusted, depending upon the wear on the friction facings of the clutch disk 8, so that the diaphragm spring 9 maintains its position in the clutch housing 1 over the entire path of wear. The contact-pressure force A exerted on the contact-pressure plate 7 by the diaphragm spring 9 is accordingly always constant.

The friction clutch is actuated by a clutch release 11 which is arranged concentric to the axis of rotation 6 and has a housing 13 which is fastened to the gear unit housing, not shown, e.g., via screws. A piston 36 is supported in the housing 13 so as to be displaceable axially and is actuated, e.g., by a hydraulic disengagement system. The piston 36 carries a release bearing 12 in such a way that the nonrevolving bearing ring is connected in a fixed manner with the piston 36 and the revolving bearing ring can act on spring tongues 14 of the diaphragm spring 9. To operate the friction clutch, the piston 36 is moved in the direction of arrow A so that the spring tongues 14 are deflected in the same direction and the radial outer region of the diaphragm spring 9 drifts in the opposite direction as a result of the flex or toggle circle in the region of the spacer bolts 32. The contact-pressure plate 7 is accordingly freed from the applied force and the clutch disk 8 can rotate freely relative to the flywheel and pressing plate. An additional spring in the form of a diaphragm spring or plate spring 15 is arranged in the region of the clutch release and, when the friction clutch is engaged, exerts no force or only a slight force, namely in the releasing direction, on the spring tongues 14 of the diaphragm spring 9, whereas in the fully disengaged state of the friction clutch it exerts a considerable disengagement force so that the force actually applied by the driver for actuating the friction clutch can be sharply reduced. The diaphragm spring or plate spring 15 is supported at its outer diameter region at a support 33 of the housing 13 and acts on the piston 36 with its radial inner region, preferably via spring tongues 19. For this purpose, a support 34 for the spring tongues 19 is provided at the piston 36. Further, at least one stop element 25 is provided in the housing 13. This stop element 25 is constructed so as to be adjustable and penetrates a central region of the diaphragm spring or plate spring 15, the head of the stop element 25 being arranged on the side facing the diaphragm spring 9.

Figure 9:
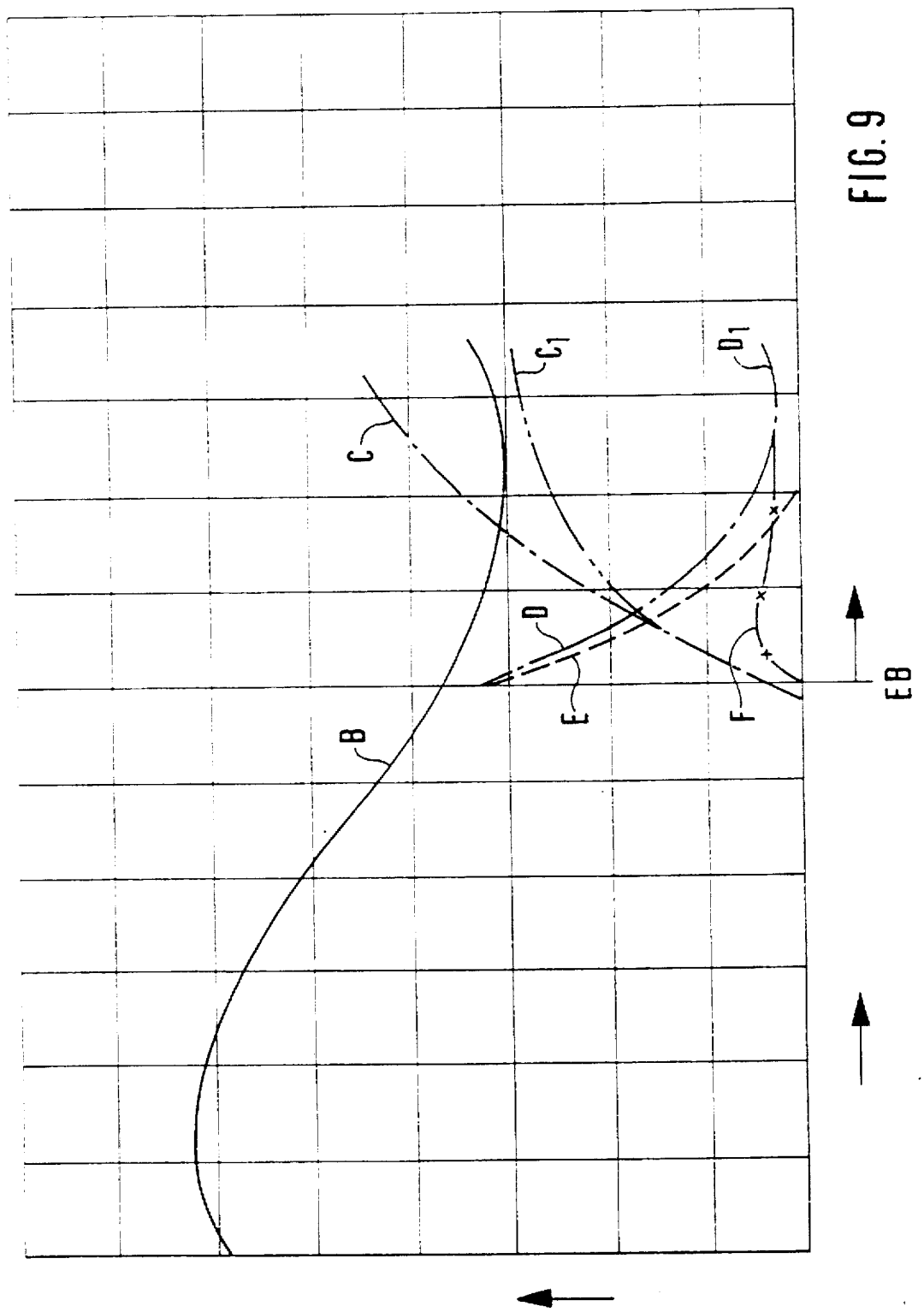
FIGS. 9 and 10 show spring characteristics of the diaphragm spring and the diaphragm spring or plate spring and the effect of the stop elements.

The operation of the friction clutch shown in FIG. 1 will be explained more fully with reference to FIG. 9. FIG. 9 shows the spring characteristics of the various springs according to FIG. 1. The spring force is plotted over the spring path, wherein an increasing spring path is equated with the increasing disengagement path of the clutch release 12 toward the left-hand side as shown in FIG. 1. The mounting position or fitting position of the diaphragm spring 9 is designated by EB and is always maintained constant by means of the wear compensating device 24. This fitting position is located in the falling branch of the spring characteristic B of the diaphragm spring 9. The spring characteristic B, in which an elevation occurs at lower spring paths and in which there is a drop with a minimum at higher spring paths, is typical of diaphragm springs. The diaphragm spring or plate spring 15, with its spring characteristic C, is designed and arranged so that it exerts the smallest possible release force on the diaphragm spring 9 in the engaged state of the friction clutch corresponding to EB and shows a steep rise toward the right as the disengagement path increases from EB. This steep rise basically ensures that the driver need only apply the difference force between B and C. However, it must be ensured that lines B and C do not intersect, because after such an intersection the force of the diaphragm spring or plate spring 15 would be larger than the force of the plate spring 9 so that the clutch would remain in the disengaged state and the subsequent engaging process could not be carried out. To this end, one or more stop elements 25 are arranged so as to be distributed around the circumference so that the spring characteristic of the diaphragm spring or plate spring 15 can be influenced in the region of greater disengagement paths so that the spring characteristic $C_1$ is formed and an intersection with characteristic B is prevented. Of course, it is possible to make do with one stop element 25 which ensures that the originally steep characteristic C passes into an arc corresponding to $C_1$ as is shown in FIG. 9.

The rest of the characteristics shown in FIG. 9 will now be described. If the values of characteristic $C_1$ diverge from those of characteristic B, characteristic $D_1$ results. This represents the disengagement force applied by the driver with the entire clutch system considered as rigid. However, since the clutch housing, for example, has elasticity in the axial direction and clutch disks are provided in most cases with facing suspension, the following situation results. The elasticity which is provided primarily in the clutch disks for facing suspension is represented by characteristic E. The elasticity values begin together with characteristic D at the fitting position EB somewhat below characteristic B, specifically corresponding to the residual force of the diaphragm spring or plate spring 15 at the mounting or fitting point. The forces of characteristic E act opposite to the contact-pressure force A and accordingly assist the driver in that the latter need only apply the difference force between characteristics E and D. Thus, characteristic F is given as the actuating force for the friction clutch. This characteristic F is 0 at the fitting point and passes directly into $D_1$ when the facing suspension is fully relaxed.

Since it is possible to adjust the diaphragm spring or plate spring 15 subsequently via the stop elements 25, it is possible on the one hand to compensate for the relatively wide tolerances of diaphragm springs and on the other hand to realize a steep characteristic $C_1$ at the fitting point which can be modified by means of the stop elements such that the clutch functions faultlessly at low actuating force.

Figure 2A:
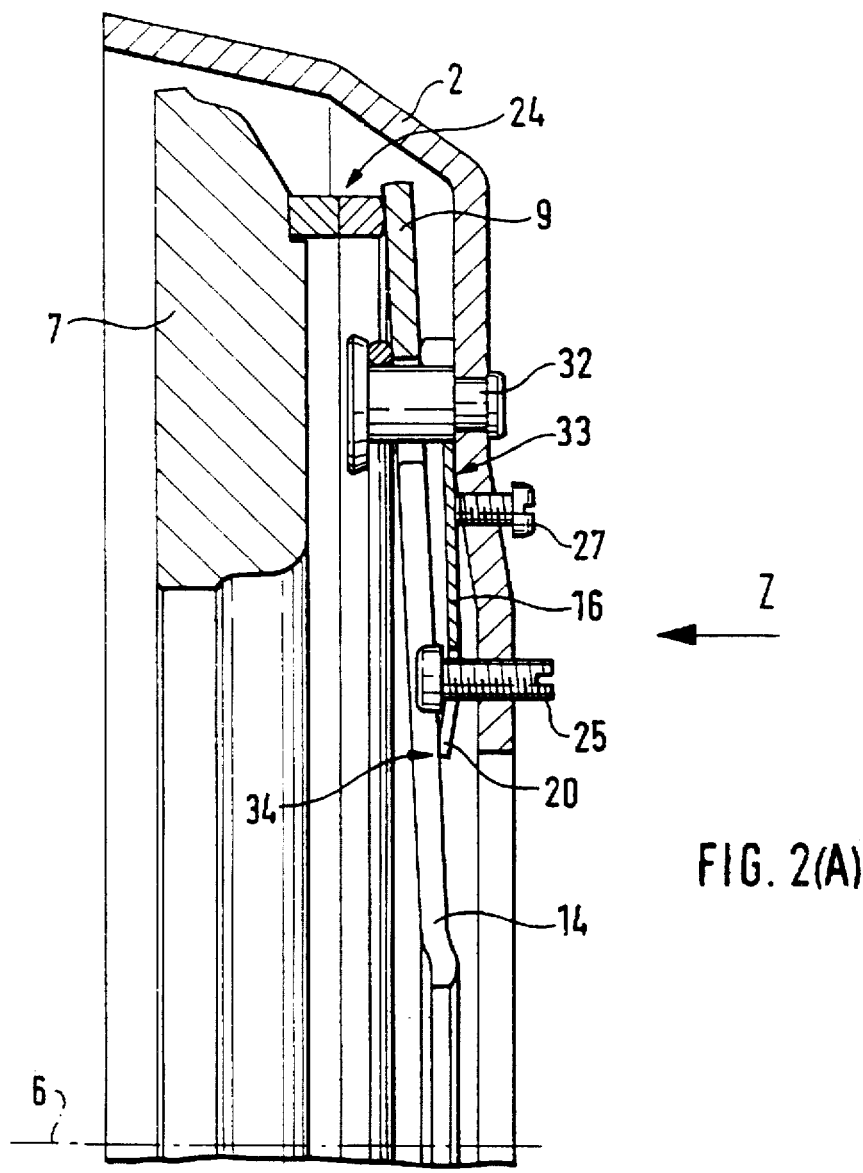
FIGS. 2 to 6 show various embodiments of pushed diaphragm spring clutches incorporating the teachings of the present invention.
Figure 2B:
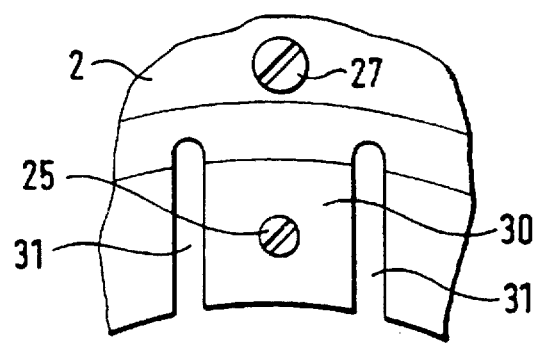
Figure 3:
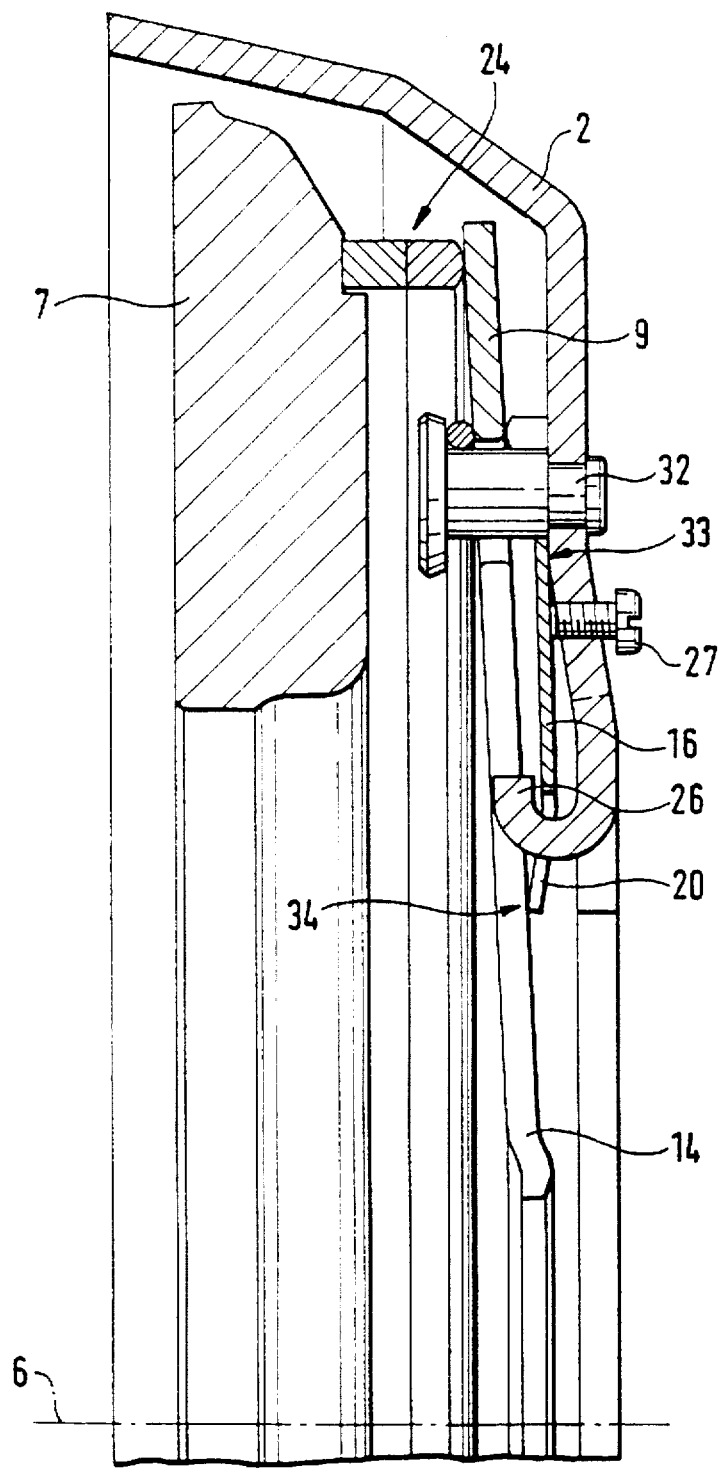

Construction variants of FIG. 1 are shown in FIGS. 2 and 3. The diaphragm springs and plate springs 16 are arranged directly in the clutch in both instances, namely between the diaphragm spring 9 and the clutch housing 2. Springs 16 are arranged with their outer diameters approximately in the region of the spacer bolts 32 and extend inward radially up to the spring tongues 14 of the diaphragm spring 9. In this region, the springs 16 are also outfitted with spring tongues 20 which form a support 34 relative to the spring tongues 14. In FIG. 2A, a stop element 25 is provided for influencing the characteristic corresponding to $C_1$ as shown in FIG. 9. The stop element 25 is arranged in the clutch housing 2 so as to be axially displaceable and adjustable. The stop element 25 has a head on the side of the spring 16 facing the contact-pressure plate 7 and can accordingly limit the development of force of the spring 16 in the end region of the disengagement path. FIG. 2B shows that the regions of the clutch housing 2 provided with the stop element 25 are designed as spring tabs 30 by means of radially extending cut-outs 31 so that the effect of the stop element 25 begins gradually and not suddenly. The outer diameter region of the spring 16 contacts the inner side of the clutch housing 2 via a support 33 and the construction has at least one additional stop element 27 which is likewise arranged in the clutch housing 2 so as to be displaceable axially and can act on the spring 16 in a region of smaller diameter than the outer diameter. It is possible to influence the steepness of characteristic C shown in FIG. 9 by means of this additional stop element 27. In the engaged state of the friction clutch, the support of the spring 16 by means of one or more stop elements 27 can be reduced to a smaller diameter so that the spring 16 has a steeper characteristic in this region. During operation and during the increasing disengagement path, the support of the spring 16 in its outer diameter region then drifts away from the stop element 27 toward the support 33 on a greater diameter. In most cases it is sufficient to arrange one stop element 27 so that this transition is also effected gradually by an eccentric loading of the spring 16.

FIG. 3 shows the construction of a stop element 26 as a bent tab of the clutch housing 2. Adjustment of this stop element 26 is effected by means of plastic deformation. Such a design is simple and cannot be influenced subsequently, e.g., by an unauthorized person.

Figure 4:
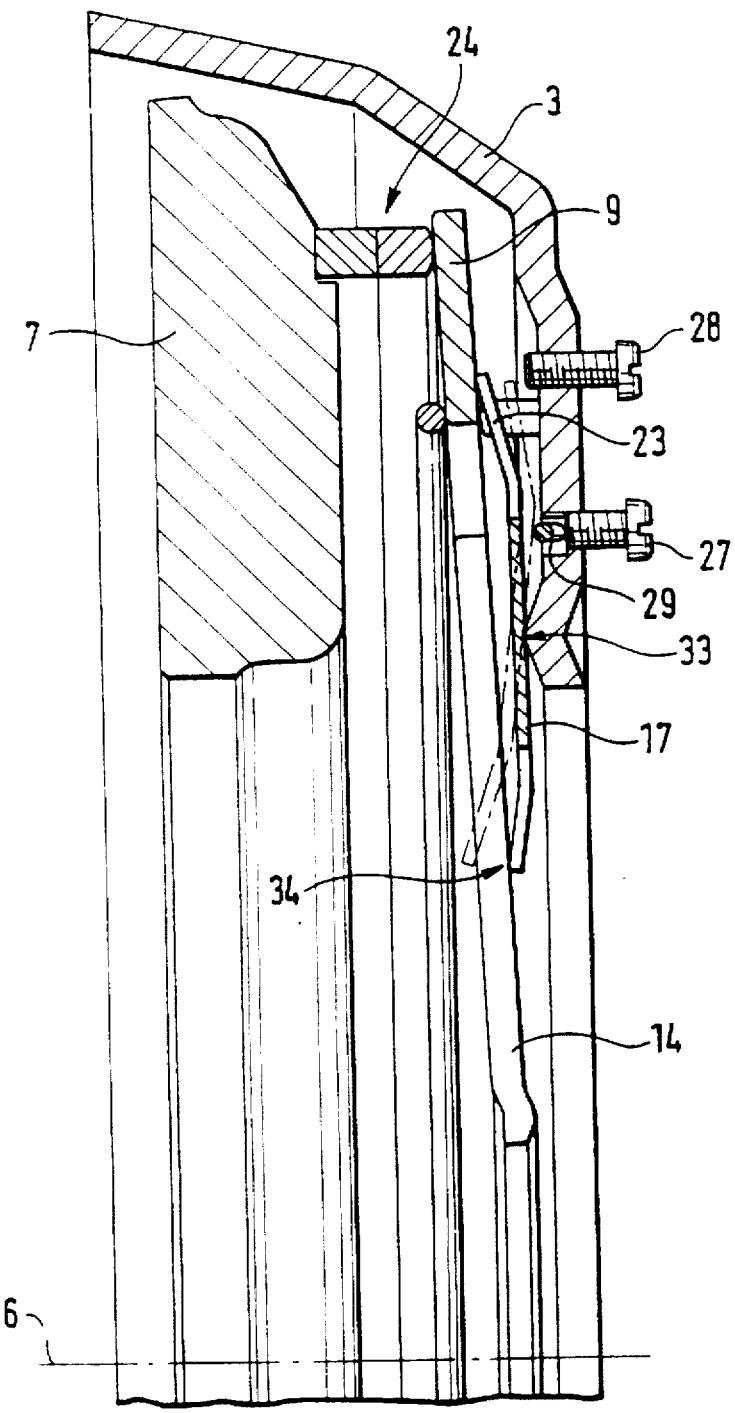
Figure 5:
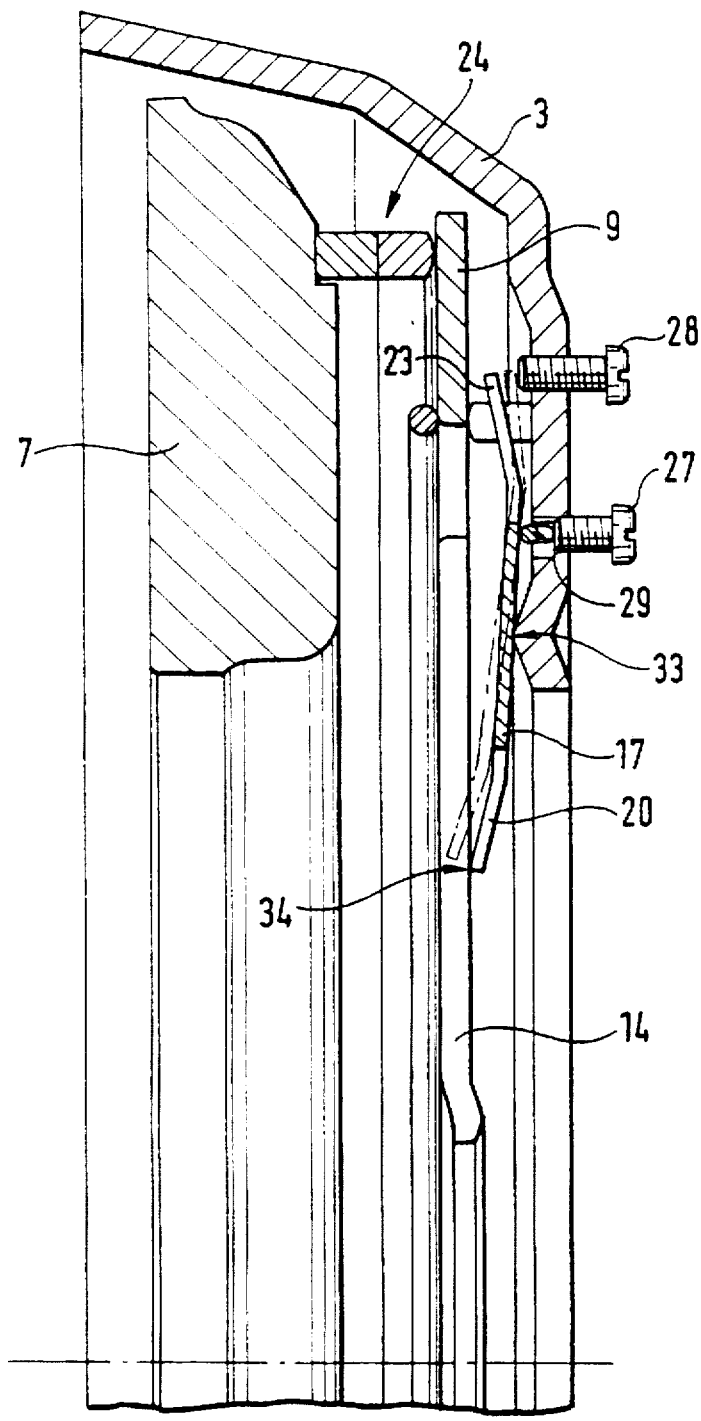
Figure 6:
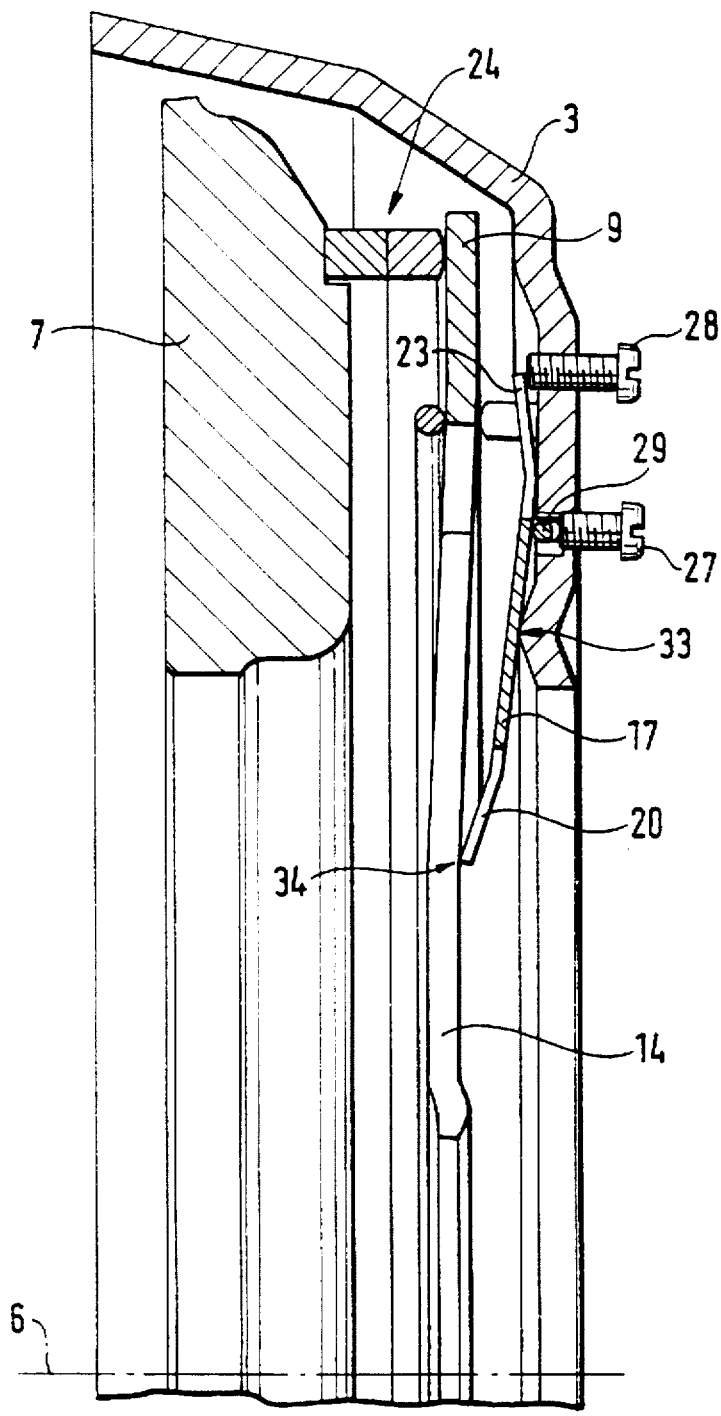
Figure 10:
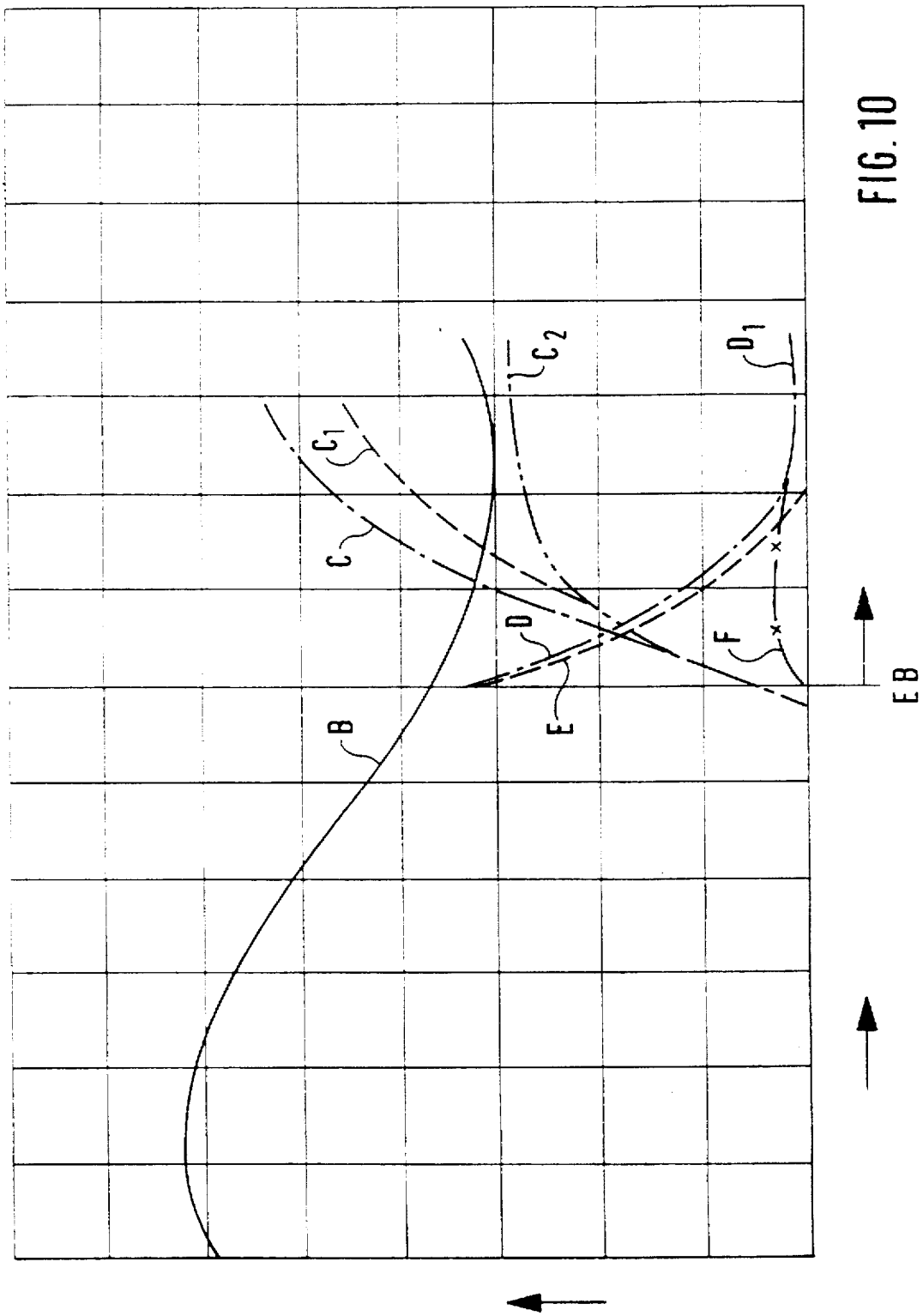

FIGS. 4 to 6 show another variant of a diaphragm spring or plate spring 17 in various positions. FIG. 4 corresponds to the engaged position shown in FIG. 10 by EB. FIG. 5 corresponds roughly to half the disengagement path and FIG. 6 corresponds to the fully disengaged position with maximum disengagement path. In this construction, the spring 17 is so arranged that it is supported in a central diameter region on the inner side of the clutch housing 3 at a support 33. The spring 17 is provided toward the radial inner side with spring tongues 20 which contact the outer side of the spring tongues 14 of the diaphragm spring 9'. Two different stop elements 27, 28 can be arranged radially one above the other in an adjustable manner in the clutch housing 3, at least one example of each type being provided. The adjustable stop elements 27 are arranged in the region of the outer diameter of the spring 17 and the spring 17 has spring tongues 23 which are directed outward radially proceeding from the outer diameter. In the engaged state corresponding to FIG. 4, these spring tongues 23 ensure that the spring 17 cannot accidentally snap back into its inactive position in that these spring tongues 23 likewise contact the diaphragm spring 9. During the disengagement process, the outer diameter region of the spring 17 moves in the direction of the stop element 27 and can make contact in the region of the greater disengagement path by means of a corresponding adjustment of this stop element 27 in that region so that the originally steep spring characteristic passes into a flatter shape. In so doing, it can be advantageous to provide an additional springing element, e.g., in the form of a concentrically extending wave spring 29, between the stop element 27 and the spring 17. FIG. 10 shows the effect of this change of contact from the support 33 to the spring 29. The originally steep characteristic of spring 17 corresponding to C is so arranged that it has the smallest possible positive value in region EB and then rises very steeply. As a result of the change of contact from 33 to 29, characteristic C passes into characteristic $C_1$ which has a flatter slope. Additional stop elements 28 are provided in order to prevent an intersection with characteristic B, these stop elements 28 being arranged in the clutch housing 3 so as to be adjustable and cooperating with the spring tongues 23 which face outward radially. By means of these stop elements 28, it is possible to bring the spring characteristic to $C_2$. This accordingly results in a very low actuating force F on the part of the driver, all other conditions remaining the same.

Figure 7:
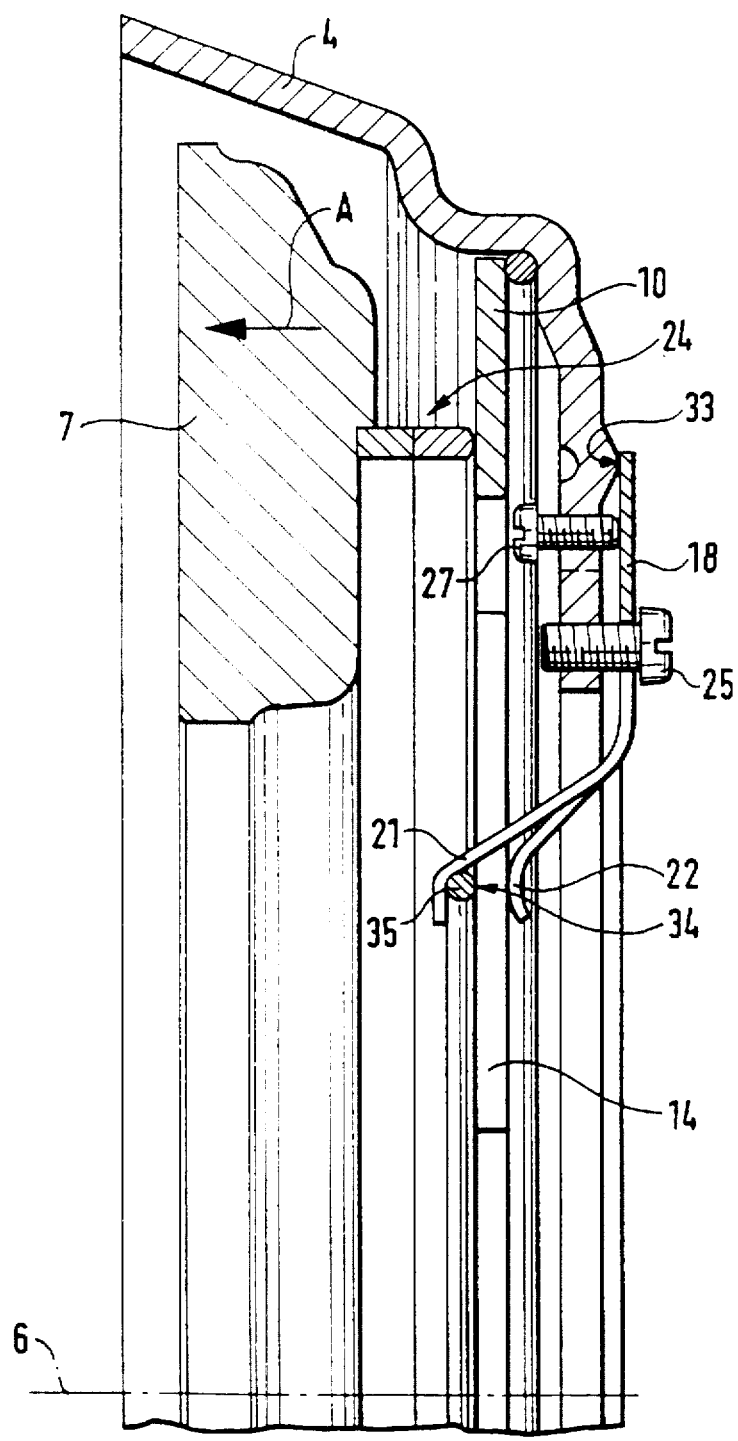
FIGS. 7 and 8 show embodiments of pulled diaphragm spring clutches.

FIG. 7 shows a friction clutch which is designed as a so-called pulled clutch. In this construction, the diaphragm spring 10 is supported in the region of its outer diameter at the clutch housing 4 and on a smaller diameter, via the structural component parts of the wear compensating device 24 on the contact-pressure plate 7. The spring tongues 14 which face inward radially are acted upon by a disengagement system which moves the spring tongues in the direction opposite to arrow A. A diaphragm spring or plate spring 18 is arranged on the outer side of the clutch housing 4 and contacts the clutch housing 4 in the region of its outer diameter via a support 33. The diaphragm spring or plate spring 18 extends through intermediate spaces in the spring tongues 14 of the diaphragm spring 10 by means of spring tongues 21 which face inward radially and is anchored at the rear side, e.g., by means of a concentrically extending ring 35. The ring 35 forms the support 34 of the spring 18 against the diaphragm spring 10. The spring 18 is likewise pretensioned so that it exerts no releasing force or only a slight releasing force on the diaphragm spring 10 in the direction opposite to arrow A in the engaged state of the friction clutch and increases this force as the disengagement path increases. In order to prevent the risk of the spring 18 snapping back in the engaged state, additional spring tongues 22 are distributed along the circumference and are supported on the outer side of the spring tongues 14 of the diaphragm spring 10 and thus also fix the spring 18 relative to the diaphragm spring 10 in the engaged state. Two stop elements 25, 27 are arranged radially one above the other in the clutch housing 4 and can be used to influence the spring characteristic of the spring 18. The stop element 27 is arranged on a smaller diameter than the support 33 at the clutch housing 4 of the outer diameter of the spring 18. The spring 18 can be made to change contact by means of this stop element 27, namely from a smaller diameter to a larger diameter, so that the spring characteristic can be changed from the originally steep shape to a flatter shape. As a result of the stop element 25 radially inside the stop element 27, it is possible to support the spring 18 in the end region of the disengagement path so as to reliably prevent an intersection between characteristics B and C as shown in FIG. 9.

Figure 8:
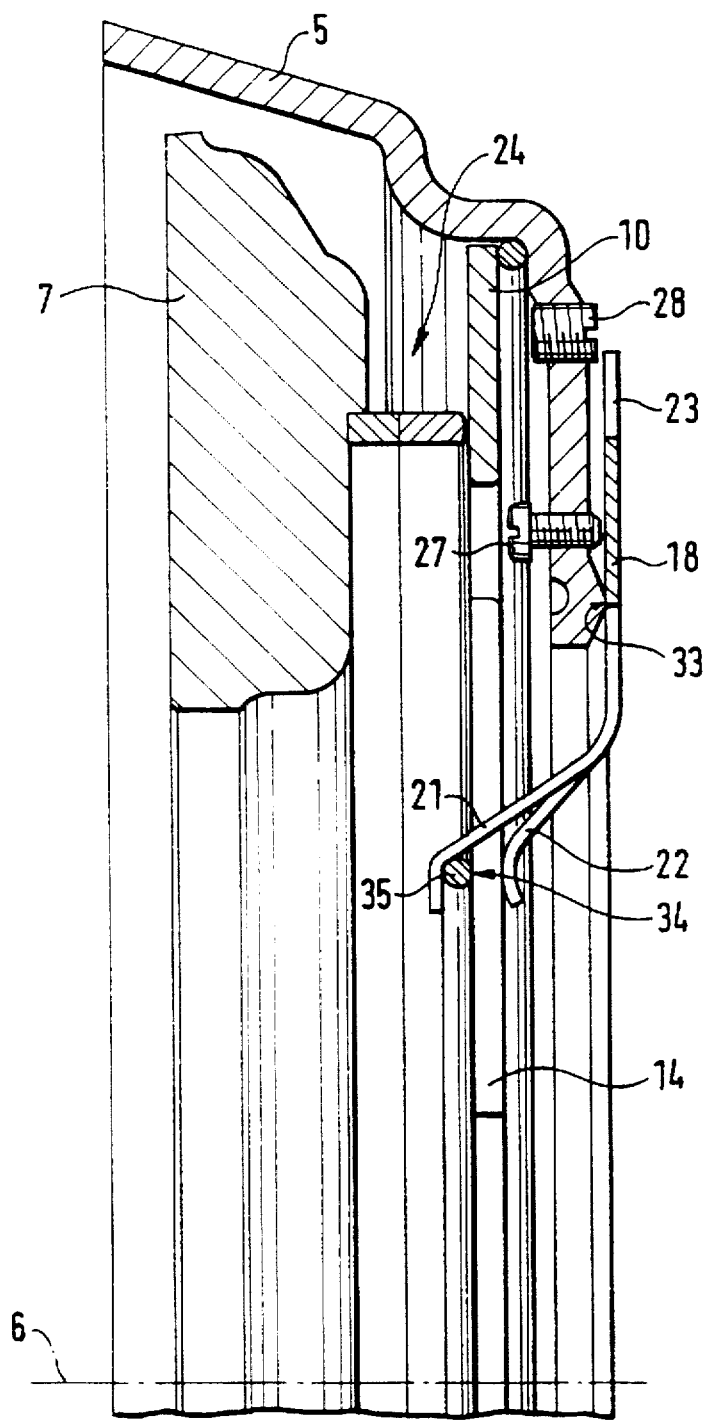

FIG. 8 shows a variant of FIG. 7 in which the diaphragm spring or plate spring 18 contacts the clutch housing 5 by a central diameter via the support 33 and the stop elements 27, 28 are arranged radially on the outer side. The spring 18 can be made to change contact during the disengagement process toward a larger diameter via the stop element or stop elements 27 so that the spring characteristic of the spring 18 is flattened. Further, the spring 18 is provided with at least one spring tongue 23 which faces outward radially and can cooperate with a stop element 28 in the clutch housing 5. As a result of the stop element 28, the characteristic lines B and $C_1$ according to FIG. 9 do not come too close to one another or even intersect in the end region of the spring characteristic of the spring 18, that is, in the almost disengaged state. The rest of the elements of the friction clutch according to FIG. 8 correspond to those shown in FIG. 7. Thus, a device 24 serving to compensate for wear is provided between the diaphragm spring 10 and the contact-pressure plate 7. Further, the spring 18 is provided radially toward the inner side with two kinds of spring tongues 21, 22 which produce a secure connection with the spring tongues 14 of the diaphragm spring 10.

The invention is not limited by the embodiments described above which are presented as examples only but can be modified in various ways within the scope of protection defined by the appended patent claims.

We claim:

1. Friction clutch in a drive train of a motor vehicle having an internal combustion engine with a flywheel, comprising:
 a clutch housing fastenable to the flywheel so that the clutch housing and the flywheel revolve about an axis of rotation;
 a contact-pressure plate arranged in the clutch housing so as to be fixed with respect to rotation but axially displaceable relative thereto;
 a clutch disk arranged between the contact-pressure plate and the flywheel, the clutch disk having friction facings;
 diaphragm spring means supported on one side at the contact-pressure plate and on another side at the clutch housing for loading the contact-pressure plate in a direction of the flywheel to generate a contact-pressure force;
 disengaging means including a disengaging element arranged to act on radial inner regions of the diaphragm spring means;
 means for automatically compensating for wear of the friction facings of the clutch disk so as to maintain a fitting position of the diaphragm spring means and the contact-pressure force;
 further spring means having a steep spring characteristic and supported on one side at an axially fixed structural component and on another side at another structural component so as to be within an actuating chain formed between the contact-pressure plate and the disengaging means, the further spring means being operative to exert substantially no releasing force when the friction clutch is engaged and to exert increasing releasing force as a disengagement path of the clutch increases; and
 at least one adjustable stop element arranged to define at least one of a level and progression of force exerted by the further spring means.

2. A friction clutch according to claim 1, wherein the further spring means includes a diaphragm spring.

3. A friction clutch according to claim 1, wherein the further spring means includes a plate spring.

4. A friction clutch according to claim 1, wherein the another side of the further spring means is supported at the diaphragm spring means.

5. A friction clutch according to claim 1, wherein the further spring means is supported on the one side at the clutch housing.

6. A friction clutch according to claim 1, wherein the stop element is arranged at a fixed structural component part so as to be adjustable and extend into a movement space of the further spring means.

7. A friction clutch according to claim 6, wherein the stop element is arranged to support the further spring in a springing resilient manner.

8. A friction clutch according to claim 6, wherein the diaphragm spring means includes a diaphragm spring, and further comprising support elements arranged to support the diaphragm spring in a central diameter region at the clutch housing so as to form a pivot circle, the diaphragm spring having a radial outer region arranged to act on the contact-pressure plate, the diaphragm spring having a radial inner side with spring tongues, the disengaging means being operative to act on the spring tongues, the further spring means being arranged between the diaphragm spring and the clutch housing and having a radial inner region provided with spring tongues, the further spring means being arranged so that, in an engaged state of the friction clutch and at least along a first region of a disengagement path, the spring tongues act on the spring tongues of the diaphragm spring radially between the pivot circle and a working region of the disengaging means, the at least one adjustable stop element being arranged at the clutch housing in this diameter so as to limit an axial force effect of the further spring means in its radial inner region in a direction of the spring tongues of the diaphragm spring.

9. A friction clutch according to claim 8, wherein a region of the clutch housing in which the stop element is arranged is constructed as a resilient spring tab.

10. A friction clutch according to claim 9, wherein the clutch housing has cut-out portions arranged on both sides of the stop element and extend radially from an inner radial edge of the clutch housing so as to form the spring tab.

11. A friction clutch according to claim 8, wherein the stop element is formed as a tab which is bent out of the clutch housing so as to be adjustable by plastic deformation relative to the further spring means.

12. A friction clutch according to claim 7, wherein the diaphragm spring means includes a diaphragm spring, and further comprising support elements arranged to support the diaphragm spring in a central diameter region at the clutch housing so as to form a pivot circle, the diaphragm spring having a radial outer region arranged to act on the contact-pressure plate, the diaphragm spring having a radial inner side with spring tongues, the disengaging means being operative to act on the spring tongues, the further spring means being arranged between the diaphragm spring and the clutch housing so as to be contactable at a support area in a radial outer diameter region with an inner wall of the clutch housing at least in a second region of a disengagement path, the at least one adjustable stop element being arranged on a diameter smaller than that corresponding to the support area so as to reduce contact of the further spring means, at least in a circumferentially defined region and at least in a first region of the disengagement path, to a smaller diameter.

13. Friction clutch according to claim 6, wherein the diaphragm spring means includes a diaphragm spring, and further comprising support elements arranged to support the diaphragm spring in a central diameter region at the clutch housing so as to form a pivot circle, the diaphragm spring having a radial outer region arranged to act on the contact-pressure plate, the diaphragm spring having a radial inner side with spring tongues, the disengaging means being operative to act on the spring tongues, the clutch housing having a circumferential bead, the further spring means being arranged between the diaphragm spring and the clutch housing so as to be supported in a central diameter region at the circumferential bead of the clutch housing and so as to cooperate via a larger diameter region with the stop element arranged in the clutch housing.

14. A friction clutch according to claim 13, and further comprising a spring element arranged between the further spring means and the stop element.

15. A friction clutch according to claim 14, wherein the spring element is a wave spring.

16. A friction clutch according to claim 13, wherein the further spring means includes at least one radially extending spring tongue proceeding from an outer diameter region so that the spring tongue, in the engaged state of the friction clutch, prevents the further spring means from snapping over, and cooperates in a second region of the disengagement path with the at least one adjustable stop element arranged in the clutch housing.

17. A friction clutch according to claim 6, wherein the diaphragm spring means includes a diaphragm spring, the diaphragm spring being supported in a radial outer region at the clutch housing and, in a central region, at the contact-pressure plate, the diaphragm spring having spring tongues arranged radially on an inner side so as to be acted upon by the disengaging means, the further spring means being arranged on an outer side of the clutch housing facing away from the diaphragm spring and being arranged to act, at least along a first region of the disengagement path, via the spring tongues on the spring tongues of the diaphragm spring in a region between a support region at the contact-pressure plate and a working region of the disengaging means, the at least one adjustable stop element being arranged in this diameter region at the clutch housing so as to limit the further spring in a region of the spring tongues with respect to an axial force effect in the direction of the spring tongues of the diaphragm spring.

18. A friction clutch according to claim 6, wherein the diaphragm spring means includes a diaphragm spring, the diaphragm spring being supported in a radial outer region at the clutch housing and, in a central region, at the contact-pressure plate, the diaphragm spring having spring tongues arranged radially on an inner side so as to be acted upon by the disengaging means, the further spring means being arranged on an outer side of the clutch housing facing away from the diaphragm spring so as to contact the clutch housing in a support area of the further spring means in a radial outer diameter region at least in a second region of the disengagement path, the at least one adjustable stop element being arranged on a diameter which is smaller than the radial outer diameter region so that the stop element reduces the contact of the further spring means at least in a circumferentially defined region and at least in a first region of the disengagement path, to a smaller diameter.

19. A friction clutch according to claim 6, wherein the diaphragm spring means includes a diaphragm spring, the diaphragm spring being supported in a radial outer region at the clutch housing and, in a central region, at the contact-pressure plate, the diaphragm spring having spring tongues arranged radially on an inner side so as to be acted upon by the disengaging means, the clutch housing having a circumferential bead, the further spring means being supported on an outer side of the clutch housing facing away from the diaphragm spring, and further supported, via a central diameter region, at the circumferential bead of the clutch housing, the further spring means being configured to cooperate along a larger diameter region with the at least one adjustable stop element at least in a second region of the disengagement path and at least in a circumferentially defined region.

20. A friction clutch according to claim 19, wherein the further spring means includes at least one spring tongue which faces outward radially and cooperates in a second region of the disengagement path with an adjustable stop element arranged in the housing.

21. A friction clutch according to claim 17, wherein the further spring means has two different types of spring tongues which are directed radially inward, including a first type that penetrates intermediate spaces between the individual spring tongues of the diaphragm spring and contacts the spring tongues on the side of the diaphragm spring facing the contact-pressure plate via a locking ring, and a second type that is offset circumferentially and contacts at least one of the diaphragm spring tongues on an opposite side of the diaphragm spring in order to reliably prevent the diaphragm spring from snapping over.

22. A friction clutch according to claim 20, the further spring means has two different types of spring tongues which are directed radially inward, including a first type that penetrates intermediate spaces between the individual spring tongues of the diaphragm spring and contacts the spring tongues on the side of the diaphragm spring facing the contact-pressure plate via a locking ring, and a second type that is offset circumferentially and contacts at least one of the diaphragm spring tongues on an opposite side of the diaphragm spring in order to reliably prevent the diaphragm spring from snapping over.

23. A friction clutch according to claim 6, wherein the diaphragm spring means has a pushed construction which is actuated by a clutch release with revolving, axially movable elements, nonrevolving, axially movable elements, and nonrevolving, axially fixed elements, the further spring means being supported in an outer diameter region at a nonrevolving, axially fixed element of the clutch release and supported in a region of its inner diameter at a nonrevolving, axially fixed element, the at least one stop element having a head that penetrates the further spring means so that adjustable path limiting is provided at the nonrevolving, axially fixed element.

* * * * *